(12) United States Patent
Stoneback et al.

(10) Patent No.: US 9,742,495 B2
(45) Date of Patent: Aug. 22, 2017

(54) TIMING CORRECTION FOR A DOCSIS EDGE-QAM

(71) Applicant: ARRIS Enterprises, Inc., Suwanee, GA (US)

(72) Inventors: Dean A. Stoneback, Harleysville, PA (US); Nagesh S. Nandiraju, Horsham, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 393 days.

(21) Appl. No.: 14/017,388

(22) Filed: Sep. 4, 2013

(65) Prior Publication Data

US 2014/0119732 A1 May 1, 2014

Related U.S. Application Data

(60) Provisional application No. 61/718,703, filed on Oct. 25, 2012.

(51) Int. Cl.
*H01B 12/06* (2006.01)
*H04B 10/25* (2013.01)
*H04B 10/2575* (2013.01)
*H04J 3/06* (2006.01)

(52) U.S. Cl.
CPC ......... *H04B 10/25* (2013.01); *H04B 10/2575* (2013.01); *H04J 3/0661* (2013.01)

(58) Field of Classification Search
None
See application file for complete search history.

(56) References Cited

U.S. PATENT DOCUMENTS

| | | | |
|---|---|---|---|
| 6,353,604 B2 | 3/2002 | Grimwood et al. | |
| 7,539,208 B2 * | 5/2009 | Chapman | G06F 11/0709 370/466 |
| 8,184,642 B2 * | 5/2012 | Kim | H04N 21/23608 370/395.71 |
| 8,670,466 B1 * | 3/2014 | Sathe | H04J 3/0673 370/235 |

(Continued)

OTHER PUBLICATIONS

Official Action RE: Canadian Application No. 2,829,056, dated Feb. 11, 2015.

(Continued)

*Primary Examiner* — Chirag Shah
*Assistant Examiner* — Amar Persaud
(74) *Attorney, Agent, or Firm* — Lori Anne D. Swanson (57) ABSTRACT

Disclosed are techniques for timing correction for a DOCSIS Edge-QAM. Unlike the DTI required at the headend in existing solutions for DOCSIS Edge-QAM timing, the disclosed techniques may use an Edge-QAM timing deeper in to the network. The N-QAM, referring to an Edge-QAM that is deeper in the network, may be in the optical node configured to convert signals from a network headend or hub for delivery to a subscriber network element. The N-QAM device located in the node may include a local clock for deriving a local time for incoming transport streams, modulating the transport streams onto a downstream carrier for delivery to subscriber network elements using the local clock time, and adjusting the local clock time based on an average value of timestamps in the incoming transport streams.

7 Claims, 7 Drawing Sheets

(56) References Cited

U.S. PATENT DOCUMENTS

| | | | | |
|---|---|---|---|---|
| 8,869,220 B2* | 10/2014 | Quigley | ........... | H04N 21/23439 |
| | | | | 725/102 |
| 8,873,590 B2* | 10/2014 | Kim | ........................ | H04N 7/00 |
| | | | | 348/497 |
| 2005/0201399 A1* | 9/2005 | Woodward, Jr. | ...... | H04J 3/0632 |
| | | | | 370/412 |
| 2005/0265500 A1* | 12/2005 | Miao | ..................... | H04J 3/0632 |
| | | | | 375/354 |
| 2014/0064267 A1* | 3/2014 | Thi | ....................... | H04J 3/0632 |
| | | | | 370/352 |
| 2015/0207579 A1* | 7/2015 | Chapman | .............. | H04J 3/0667 |
| | | | | 370/503 |

OTHER PUBLICATIONS

Canadian Office Action, RE: Application No. 2,829,056, dated Jan. 11, 2016.

* cited by examiner

| ITEM | DESCRIPTION | | | | | | | | | |
|---|---|---|---|---|---|---|---|---|---|---|
| 1 | GLOBAL N-QAM TIME OFFSET | 0 | | | | | | | | |
| 2 | AVERAGE CMTS TO N-QAM TRANSIT TIME | 7 | | | | | | | | |
| 3 | N-QAM CLOCK CORRECTION GAIN | 0 | | | | | | | | |
| | | | | | | | | | | |
| 4 | CMTS TIME (IN SYNC MESSAGE) | 100 | 103 | 107 | 108 | 111 | 115 | 119 | 123 | 128 | 131 |
| 5 | JITTER | 0 | 0 | 0.4 | 0.2 | -0.2 | 0.6 | -0.2 | 0.4 | -0.1 | 0.4 |
| 6 | TOTAL TRANSIT TIME | 7 | 7 | 7.4 | 7.2 | 6.8 | 7.6 | 6.8 | 7.4 | 6.9 | 7.4 |
| 7 | N-QAM REAL ARRIVAL TIME | 107 | 110 | 114.4 | 115.2 | 117.8 | 122.6 | 125.8 | 130.4 | 134.9 | 138.4 |
| 8 | N-QAM CLOCK TIME (INSERTED INTO SYNC MESSAGE) | 100 | 103 | 107.4 | 108.2 | 110.8 | 115.6 | 118.8 | 123.4 | 127.9 | 131.4 |
| 9 | N-QAM REAL ARRIVAL TIME ERROR | 0 | 0 | 0.4 | 0.2 | -0.2 | 0.6 | -0.2 | 0.4 | -0.1 | 0.4 |
| 10 | N-QAM REAL AVERAGE CLOCK ERROR | | | | | 0.080 | 0.200 | 0.160 | 0.160 | 0.100 |
| 11 | TRANSIT TIME | 4 | 4 | 4 | 4 | 4 | 4 | 4 | 4 | 4 | 4 |
| 12 | CM ARRIVAL TIME | 111 | 114 | 118.4 | 119.2 | 121.8 | 126.6 | 129.8 | 134.4 | 138.9 | 142.4 |
| 13 | CM CLOCK TIME | 100 | 103 | 107.4 | 108.2 | 110.8 | 115.6 | 118.8 | 123.4 | 127.9 | 131.4 |

| ITEM | DESCRIPTION | | | | | | | | | | |
|---|---|---|---|---|---|---|---|---|---|---|---|
| 1 | GLOBAL N-QAM TIME OFFSET | 0 | | | | | | | | | |
| 2 | AVERAGE CMTS TO N-QAM TRANSIT TIME | 7 | | | | | | | | | |
| 3 | N-QAM CLOCK CORRECTION GAIN | 0 | | | | | | | | | |
| 4 | CMTS TIME (IN SYNC MESSAGE) | 100 | 103 | 107 | 108 | 111 | 115 | 119 | 123 | 128 | 131 |
| 5 | JITTER | 0 | 0 | 0.4 | 0.2 | -0.2 | 0.6 | -0.2 | 0.4 | -0.1 | 0.4 |
| 6 | TOTAL TRANSIT TIME | 7 | 7 | 7.4 | 7.2 | 6.8 | 7.6 | 6.8 | 7.4 | 6.9 | 7.4 |
| 7 | N-QAM REAL ARRIVAL TIME | 107 | 110 | 114.4 | 115.2 | 117.8 | 122.6 | 125.8 | 130.4 | 134.9 | 138.4 |
| 8 | N-QAM CLOCK TIME (INSERTED INTO SYNC MESSAGE) | 100 | 103 | 107.4 | 108.2 | 110.8 | 115.56 | 118.664 | 123.2016 | 127.659 | 131.1706 |
| 9 | N-QAM REAL ARRIVAL TIME ERROR | 0 | 0 | 0.4 | 0.2 | -0.2 | 0.56 | -0.336 | 0.2016 | -0.34096 | 0.170576 |
| 10 | N-QAM REAL AVERAGE CLOCK ERROR | | | | | | 0.080 | 0.192 | 0.125 | 0.085 | -0.023 |
| 11 | TRANSIT TIME | 4 | 4 | 4 | 4 | 4 | 4 | 4 | 4 | 4 | 4 |
| 12 | CM ARRIVAL TIME | 111 | 114 | 118.4 | 119.2 | 121.8 | 126.6 | 129.8 | 134.4 | 138.9 | 142.4 |
| 13 | CM CLOCK TIME | 100 | 103 | 107.4 | 108.2 | 110.8 | 115.6 | 118.664 | 123.2016 | 127.659 | 131.1706 |

| ITEM | DESCRIPTION | | | | | | | | | |
|---|---|---|---|---|---|---|---|---|---|---|
| 1 | GLOBAL N-QAM TIME OFFSET | 7 | | | | | | | | |
| 2 | AVERAGE CMTS TO N-QAM TRANSIT TIME | 7 | | | | | | | | |
| 3 | N-QAM CLOCK CORRECTION GAIN | 50 | | | | | | | | |
| 4 | CMTS TIME (IN SYNC MESSAGE) | 100 | 103 | 107 | 108 | 111 | 115 | 119 | 123 | 128 | 131 |
| 5 | JITTER | 0 | 0 | 0.4 | 0.2 | -0.2 | 0.6 | -0.2 | 0.4 | -0.1 | 0.4 |
| 6 | TOTAL TRANSIT TIME | 7 | 7 | 7.4 | 7.2 | 6.8 | 7.6 | 6.8 | 7.4 | 6.9 | 7.4 |
| 7 | N-QAM REAL ARRIVAL TIME | 107 | 110 | 114.4 | 115.2 | 117.8 | 122.6 | 125.8 | 130.4 | 134.9 | 138.4 |
| 8 | N-QAM CLOCK TIME (INSERTED INTO SYNC MESSAGE) | 100 | 110 | 114.4 | 115.2 | 117.8 | 122.56 | 125.664 | 130.2016 | 134.659 | 138.1706 |
| 9 | N-QAM REAL ARRIVAL TIME ERROR | 0 | 0 | 0.4 | 0.2 | -0.2 | 0.56 | -0.336 | 0.2016 | -0.34096 | 0.170576 |
| 10 | N-QAM REAL AVERAGE CLOCK ERROR | | | | | | 0.080 | 0.192 | 0.125 | 0.085 | -0.023 |
| 11 | TRANSIT TIME | 4 | 4 | 4 | 4 | 4 | 4 | 4 | 4 | 4 | 4 |
| 12 | CM ARRIVAL TIME | 111 | 114 | 118.4 | 119.2 | 121.8 | 126.6 | 129.8 | 134.4 | 138.9 | 142.4 |
| 13 | CM CLOCK TIME | 100 | 110 | 115.4 | 115.2 | 117.8 | 122.56 | 125.664 | 130.2016 | 134.659 | 138.1706 |

*FIG. 7*

TIMING CORRECTION FOR A DOCSIS EDGE-QAM

CROSS-REFERENCE TO RELATED APPLICATIONS

This application is a continuation of U.S. provisional patent application Ser. No. 61/718,703 filed on Oct. 25, 2012, the contents of which is incorporated herein by reference in its entirety.

BACKGROUND

Figure 1:
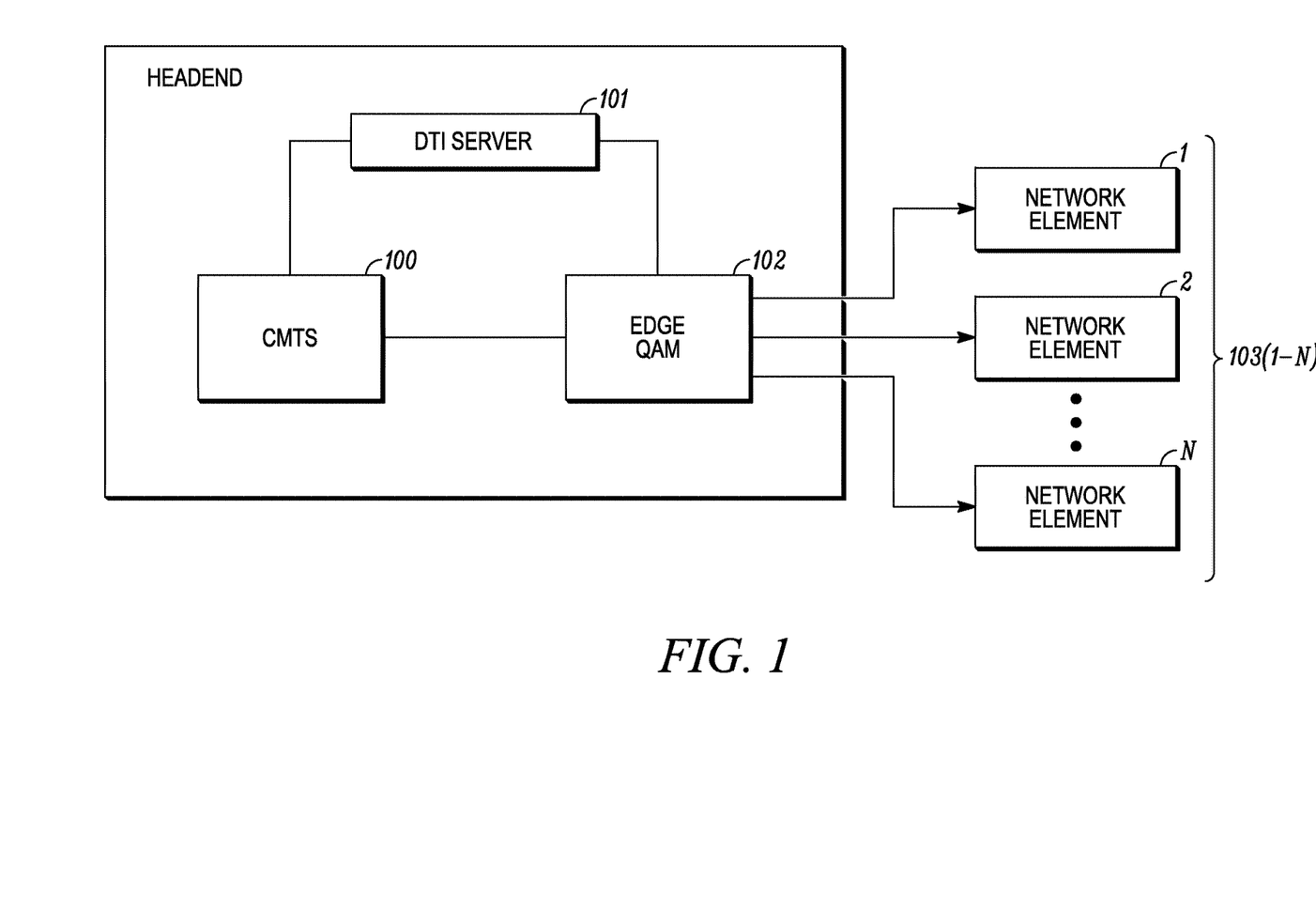
FIG. 1 depicts an example of a broadband network with a DTI server commonly used by cable TV operators.

Cable television systems have been in widespread use for many years and extensive networks have been developed. The Data Over Cable Service Interface Specification (DOCSIS) is a cable modem standard used for transferring data over a cable TV network. An example of a broadband network commonly used by cable TV operators is shown in FIG. 1. Existing headend/CMTS architectures include an Edge quadrature amplitude modulation (QAM) device 102 at the headend or hub device, having multiple Gigabit Ethernet (GigE) input ports. The Edge-QAM device receives signals from the modular cable modem termination system (M-CMTS) 100 for downstream transmission, for example, re-packetizes the video or data into a transport stream, e.g., MPEG transport stream, and digitally modulates the transport stream onto a downstream RF carrier using QAM. The Edge-QAM device can communicate signals from the CMTS to network elements 103(1-N).

A DOCSIS timing interface (DTI) server 101 provides accurate reference clock information for Edge-QAM devices 102 and modular CMTS in a typical M-CMTS architecture via a DOCSIS timing interface (DTI). The DTI is the protocol defined in the DOCSIS 3.0 DTI specification, which aims to ensure that the Edge-QAM modulator and the M-CMTS device are synchronized. The DTI in the headend may address both jitter for multiple Edge-QAMs and provide for redundancy, e.g., by allowing for a switch-over to a redundant Edge-QAM without re-ranging. The DTI functions to provide the same signal to both the primary and redundant Edge-QAMs.

Using DTI is expensive. For example, incorporating the DTI requires an expensive master clock and a separate timing interface to both the CMTS and Edge-QAM. Further, existing mechanisms for addressing jitter for Ethernet links require technology installed on both the headend Edge-QAM and the CMTS. For example, the DTI is installed at the headend, where the Edge-QAM is separate from the CMTS, e.g., in separate chassis. The DTI clock is connected to each chassis to maintain accurate timing and jitter between the CMTS and Edge-QAM streams. Further, the SYNC from the DTI server does not support long distances. For example, the current standard for the DOCSIS timing interface is limited to 250 meters, and the DTIs developed to date are limited to supporting this distance (e.g., limited to less than 250 meters). An alternative to DTI in existing DOCSIS M-CMTS deployments would be desirable, both for cost savings and to work over longer remote distances.

DETAILED DESCRIPTION

Figure 2:
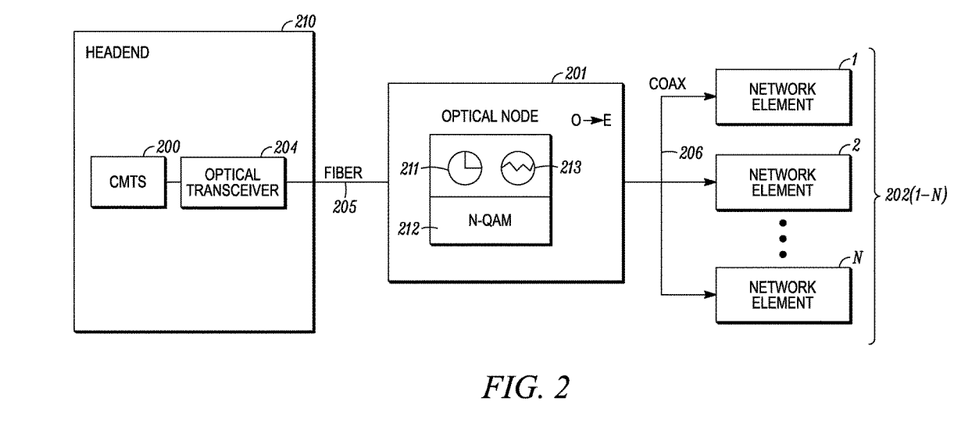
FIG. 2 depicts an example fiber coaxial (HFC) broadband network that uses the disclosed Edge-QAM timing techniques.

Disclosed herein are techniques for timing correction for a modulator, such as the DOCSIS Edge-QAM. FIG. 2 illustrates an example network that may incorporate the disclosed timing correction techniques. Unlike the DTI required at the headend in existing solutions for DOCSIS Edge-QAM timing, the techniques disclosed herein may use an Edge-QAM timing deeper in to the network. The N-QAM, which uses the timing correction techniques disclosed herein, may be an Edge-QAM located deeper in the network, such as in the optical node 201. As shown in FIG. 2, the optical node 201 includes a clock 211, an oscillator 213, and N-QAM 212.

Digital cable services carried over cable plants use QAM modulation. The Edge-QAM is the conveyer of movies, video, data services, and the like, from the cable network headend to subscriber network elements, e.g., in a subscriber's home. For example, the Edge-QAM may receive a digital signal and modulate the signal for transmission through an analog portion of the cable network until it reaches the cable set-top box (in a digital video example). Moving the Edge-QAM capability to a node between the headend and the subscriber's network element creates timing synchronization issue as the Edge-QAM/N-QAM will be remote from the CTMS and DTI server and is not available for a local feedback loop with the CTMS or DTI server to synchronize timing between the Edge-QAM and CMTS. An Edge-QAM device may support, via n number of channels, e.g., 48, video on demand (VOD), switched digital video (SDV), broadcast services or DOCSIS high-speed data (e.g., through support for the M-CMTS architecture).

The network shown in FIG. 2 is a hybrid fiber coaxial (HFC) broadband network that combines the use of optical fiber 205 and coaxial connections 206. The headend 210 may contain an optical transceiver 204 to provide optical communications through the optical fiber 205 to a plurality of nodes, as shown by the example optical node 201. The fiber optic 205 portion of the example HFC network extends from the headend to a hub and/or to a fiber optic node 201. The fiber optic node 201 may be connected to many network elements 202(1-N) of subscribers via the coaxial cable portion 206 of the network. The network may include a plurality of network elements 202 (1-N) (e.g. cable modems, set top boxes, televisions equipped with set top boxes, Data Over Cable Service Interface Specification (DOCSIS) terminal devices, media terminal adapters (MTA), embedded media terminal adapter (eMTA), or any other element on a network such as a PON or a HFC network connected to the cable modem termination system (CMTS) 200 located in a headend.

A communications device 200 such as a cable modem termination system (CMTS) is typically provided at a headend or hub site of a broadband network for providing high speed data services, such as Internet, Voice over Internet Protocol, or digital video services to subscribers of a cable TV operator or to like customers. The CMTS 200 hosts downstream and upstream ports and contains numerous receivers, each receiver handling communications between hundreds of end user network elements connected to the broadband network. For example, each CMTS 200 receiver may be connected to several modems of many subscribers, e.g., single receiver may be connected to hundreds of modems which vary widely in communication characteristics. In many instances several nodes, such as fiber optic node 201, may serve a particular area of a town or city.

Each node 201 may also contain a reverse/return path transmitter that is able to relay communications from a subscriber network element 202(1-N) to the headend 210. Downstream (also referred to as forward path) optical communications over the optical fiber are typically converted at the nodes to Radio Frequency (RF) communications for transmission over the coaxial cable. Conversely, upstream (also referred to as return path) RF communications from the network elements are provided over the coaxial cables and are typically converted at the nodes to optical communications for transmission over the optical fiber to the headend.

By way of example, a single node may be connected to thousands of cable modems or other network elements. The optical transceiver 204 may contain both a downstream optical transmitter and an upstream optical receiver. The optical transmitter 204 at the headend may convert received electrical signals to downstream optically modulated signals that can be transmitted to the nodes. Each node 201 may include a broadband optical receiver to convert the downstream optically modulated signal received from the headend/hub to an electrical signal provided to the subscribers' network elements 202(1-N) via the coaxial portion 206 of the HFC network.

Before data packets/signals leave the CMTS, a SYNC message is provided a time stamp. As the signal travels through the network, jitter is introduced. Thus, the timestamps do not always reflect the proper time. When leaving the Edge-QAM in the CMTS, an exact time is needed via the DTI solution. However, for the disclosed N-QAM deeper in to the network solution, such as in the optical node 201, the exact time of the local clock may be used. Whenever the CMTS and Edge-QAM are connected by an Ethernet link, packet jitter will be introduced. Two mechanisms that may be used by Ethernet links to convey timing to a remote node include SyncE for frequency lock and 1588v2 for time of day (ToD).

The DTI solution does not accommodate long distances (e.g., over 250 m). In embodiments disclosed herein, the timing correction for the DOCSIS Edge-QAM is achievable without the use of the DOCSIS timing interface, allowing timing to be recreated in an Edge-QAM without using DTI. Fixed time delays in the network can be ranged out during the cable modem ranging process. Thus, time stamps in sync messages do not need to have an accurate absolute time.

It is desirable that the N-QAM has a very low jitter clock. SyncE can be used, but local clocks also have sufficient short term accuracy. The N-QAM 212 can derive a local clock 211 from the average value of the time in the incoming sync messages over the fiber link 205. Thus, a clock local in the N-QAM may be accurate enough to derive appropriate timing. A local clock oscillates, and the N-QAM may use the local clock for timing. The N-QAM 212 can replace all time stamps in sync messages with its low jitter clock before sending out the sync messages. The N-QAM 212 can slowly adjust its clock to stay relatively close to the average value of the time in the incoming sync messages. Using the N-QAM in the optical node can correct for timing without a hardware change to legacy CMTS equipment. An adaptive loop algorithm may allow the N-QAM device to keep its clock frequency in lock with the CMTS clock frequency generating the original SYNC packet. Thus, measurements of local jitter may include using SYNC messages that have some jitter, but averaging it to update the local clock.

The Edge-QAM may use the local clock to derive a ToD to correct the time stamp on the sync messages, causing the sync messages to appear extremely low jittered. The N-QAM can replace the time stamps in sync messages with the low jitter ToD time before sending out the sync messages. The N-QAM may derive from the local clock an approximate Time of Day (ToD). The accuracy of this solution is solely dependent on the jitter performance of the N-QAM clock, NOT on the absolute accuracy of the N-QAM ToD.

In embodiments, the ToD can be determined via 1588v2, or from an algorithm for deriving ToD from incoming sync messages. However, because the ToD derived in the N-QAM deeper in the network (e.g., in the optical node 201) does not require the same accuracy required by the DTI/ headend solution (e.g., less than 100 ns error is achievable and more than adequate for certain arrangements), the local clock may provide an acceptably low jitter time stamp despite whether the local clock reflects the exact time. Further, multiple N-QAMs can be used to feed a service group of modems that all share an upstream channel. Even though multiple N-QAMs will have different ToD clocks, as long as they each have low jitter, the error of each N-QAM clock can be "ranged out" during cable modem ranging.

Figure 3:
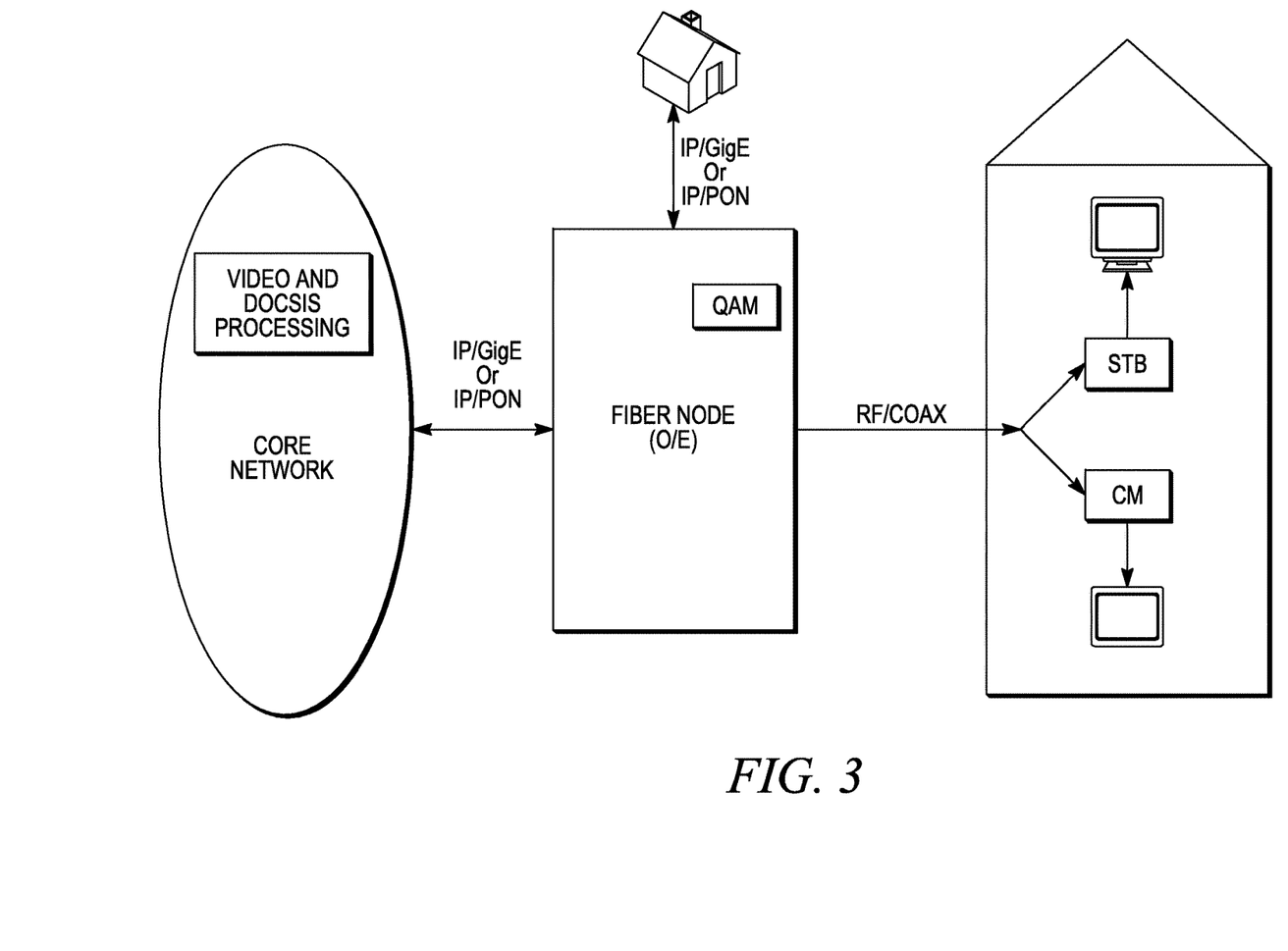
FIG. 3 depicts another example network that uses the disclosed Edge-QAM timing techniques.

FIG. 3 depicts an example of QAM in the fiber node.

Figure 4:
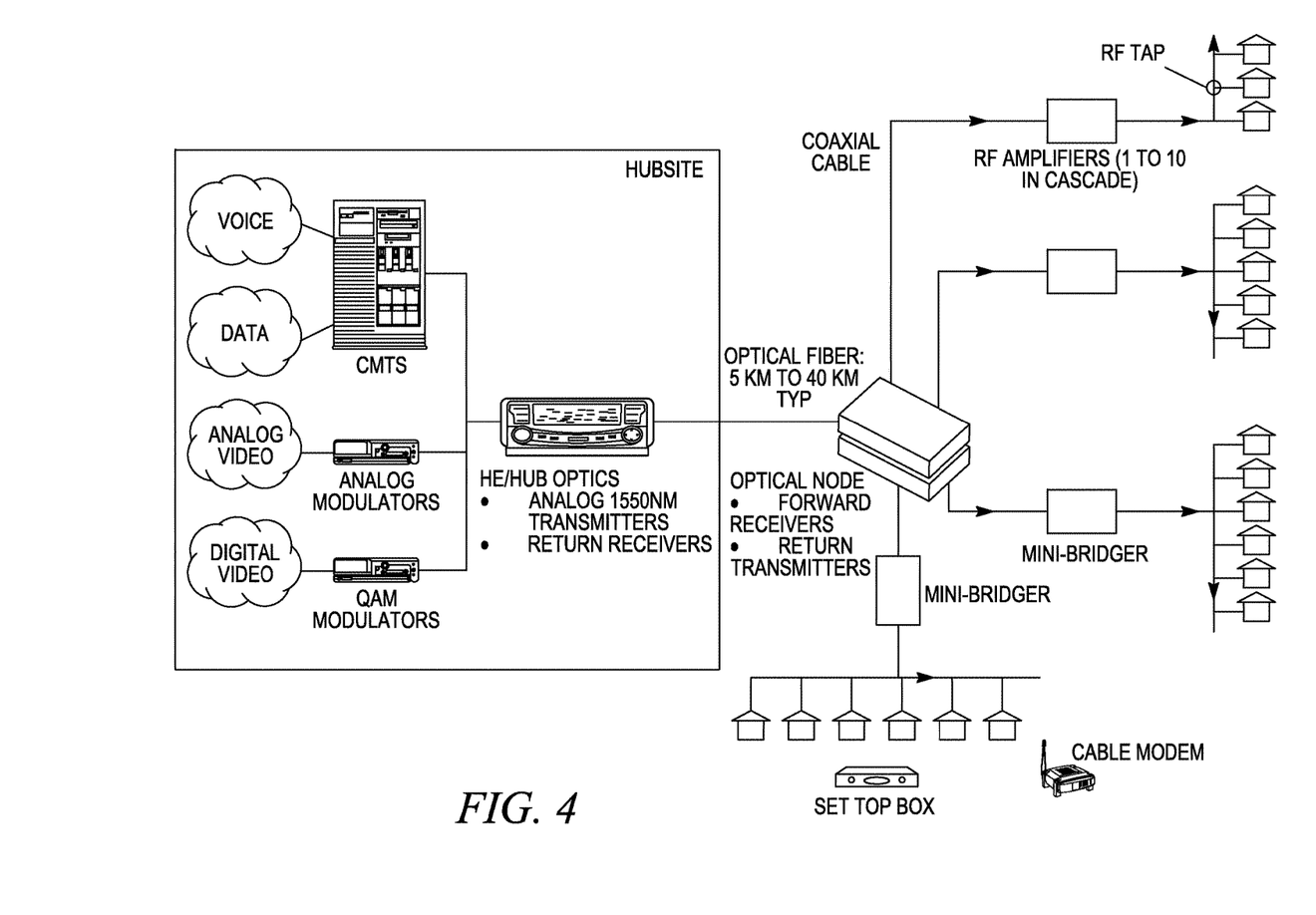
FIG. 4 depicts an example HFC network.
Figure 5:
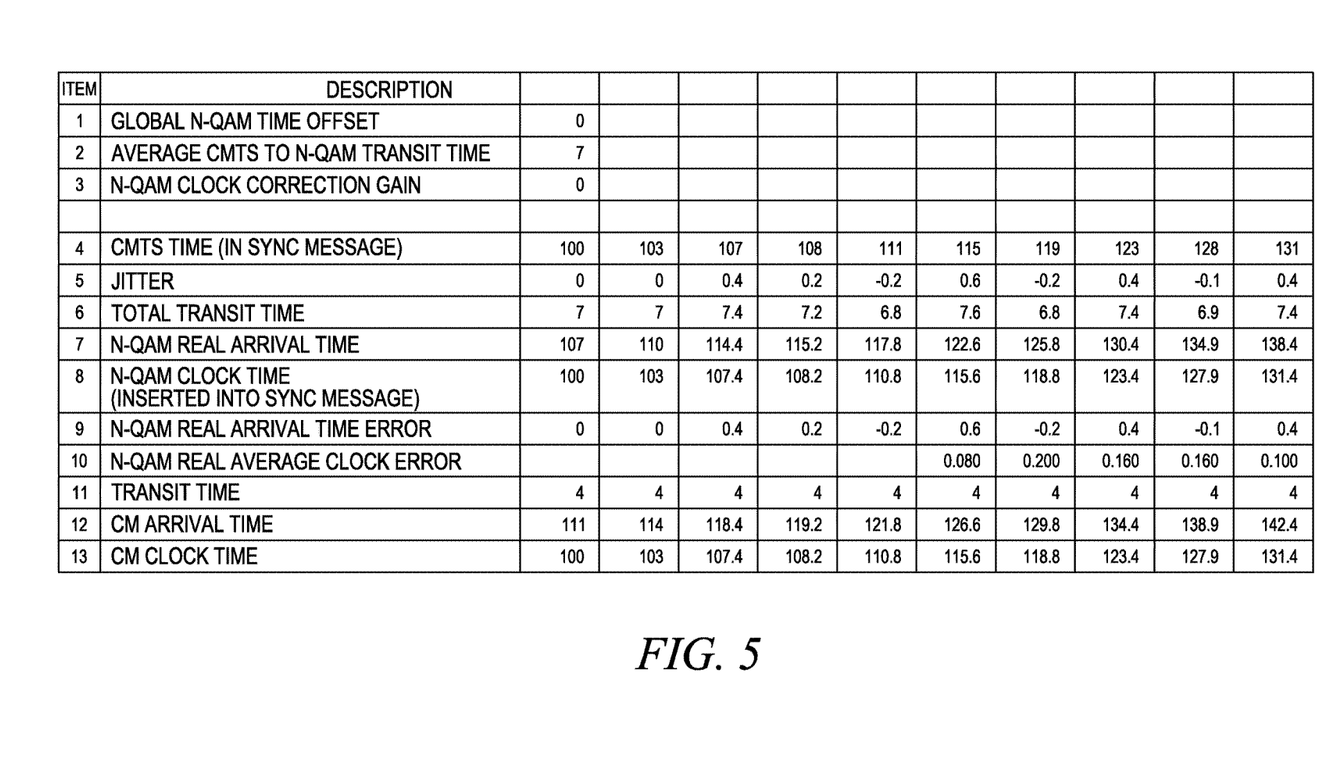
FIG. 5 depicts a specific example of the timing correction achievable by the disclosed embodiments.

FIG. 4 depicts an example HFC network. As shown in FIG. 1, the Edge-QAM in such a network is typically found at the headend or hub site, for example, coupled to the CMTS and the DTI server. In FIG. 4, the optical node communicates via an optical fiber with the headend or hub and via coaxial cable to the network elements. The N-QAM device disclosed herein, having a local clock that restamps the transport stream messages with the local clock time, is located in the optical node, FIG. 5 depicts a specific example of the timing correction achievable by the disclosed embodiments.

Items 1-3 are global parameters used only for the spreadsheet (not by the system)

Item 4 is the time stamp inserted into the sync message by the CMTS

Item 5 is an example of jitter added by the Ethernet transport

Item 7 is the actual arrival time of the sync message. This time is not used.

Item 8 is the value of the N-QAM local clock.

The local clock is derived from the incoming sync messages

The local clock does not make any sudden corrections

Over the long term, the local clock approximates the value of the sync messages

In the short term, the local clock will deviate from the value of the sync messages due to the jitter of the incoming sync messages The N-QAM replaces the content of every sync message with the exact current value of the N-QAM clock just before the sync message is passed off to the modulator.

Item 9 is the error of the value in the incoming sync message, compared to the local clock Item 10 is a rolling average of the error Items 11-13 are an example of the transit time to the CM. No jitter is added by the RF cables between the N-QAM and the CM.

In this example, the N-QAM clock is not adapting to any long term drift in the error (item 10).

Figure 6:
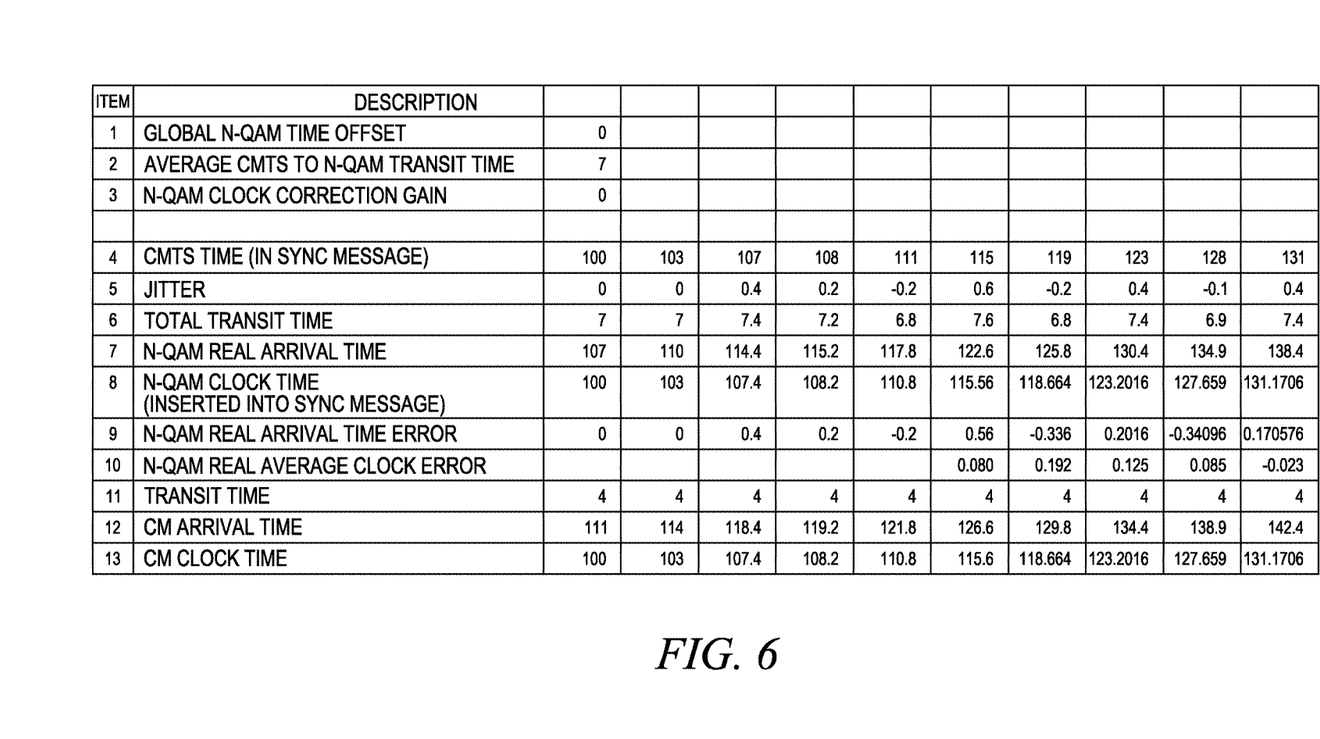
FIG. 6 depicts a specific example of the timing correction achievable by the disclosed embodiments.
Figure 7:
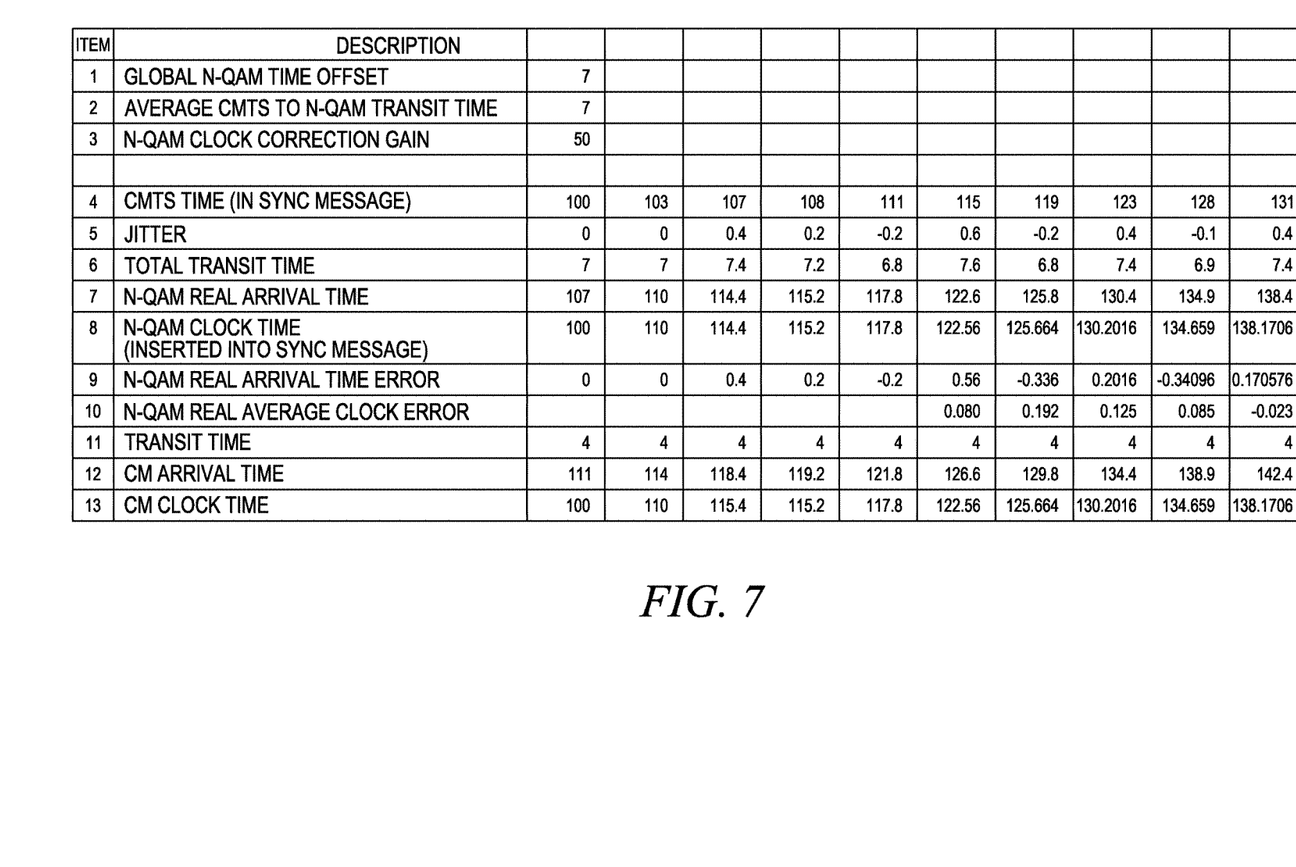
FIG. 7 depicts a specific example of the timing correction achievable by the disclosed embodiments.

FIG. 6 depicts a specific example of the timing correction, with N-QAM clock correction, achievable by the disclosed embodiments. In this example, the gain of the correction loop in the N-QAM was increased from 0 to 50 (item 3). This lowered the value of the average clock error (item 10). In actual implementation, an adaptive loop would be used to minimize the average error, rather than a simple weighted average of the error This adaptive loop would be designed to assure that any corrections to the local clock sufficiently slow to be corrected by the Station Maintenance messages between the cable modem and CMTS As described herein, the modulator may take the average time of the incoming messages, such as the incoming SYNCH messages received at an optical node if the modulator is located in the optical node. The modulator then re-stamps the messages with an exact version of the local clock. There may be a difference between the local clock arrival time of the message and the re-stamping time, such as processing time. Processing time may include the time it takes to process the incoming message before it is re-stamped, for example. FIG. 7 depicts an example using an offset with the local clock time. The offset to the local clock time may be a value, where the value may be fixed or adaptive. The offset may be communicated to the device via a control channel such that the local clock is provisioned with the offset.

FIG. 7 depicts a specific example of the timing correction, with Global N-QAM Time Offset, achievable by the disclosed embodiments. If it is very long distance link between the N-QAM and CMTS, it might be desirable for the N-QAM to insert a more realistic time into the sync messages, rather than inserting a de-jittered CMTS time back into the message.

In this example, item 1 was changed to cause the N-QAM to add a global offset of 7 to its local clock before inserting the corrected time into the sync message.

A unique global offset could be manually assigned to each N-QAM based on its distance from the CMTS.

The global offset could be calculated automatically by putting a cable modem into the N-QAM and using the ranging information from the cable modem to determine the proper offset.

The disclosed techniques provide excellent product applicability in M-CMTS implementations. The ability to operate DOCSIS M-CMTS over long remote distances also provides for Remote PHY opportunities. The disclosed techniques may provide for an Edge-QAM timing solution that addresses longer distances, such as 250 m-20 km and beyond, for example. N-QAMs 212 may be put in the node 201 and may also be used in the headend 210, for example. The N-QAM timing solution does not require an exclusive feedback loop of the DTI/headend timing correction solution and is less expensive, so it can be used for any N-QAM solution. Redundancy may be provided for the remote Edge-QAM solution, similar to the DTI server solution that accommodates for redundancy. However, it may be desirable that the remote Edge-QAM solution simply be used to correct jitter.

As disclosed, the N-QAM, referring to an Edge-QAM that uses the timing correction techniques disclosed) may be located deeper in the network, such as in the optical node, where the optical node is configured to convert signals from a network headend or hub for delivery to a subscriber network element. The optical fiber node may comprise a receiver for receiving incoming messages over an optical fiber from the network headend or hub, the incoming messages each having a timestamp, a local clock for deriving a local time for each of the incoming messages, and an N-quadrature amplitude modulation (QAM) device. The N-QAM may modulate transport streams onto a downstream carrier for delivery to subscriber network elements replacing the timestamp in each of the incoming messages with the local clock time, and adjust the local clock time based on an average value of timestamps in the incoming messages. It can also add a fixed offset to the value from the local clock before replacing the timestamp.

Thus, the N-quadrature amplitude modulation (QAM) may comprise a local clock for deriving a local time for incoming transport streams, the incoming transport streams each having a timestamp, a modulator for modulating the transport streams onto a downstream carrier for delivery to subscriber network elements using the local clock time, wherein the N-QAM device adjusts the local clock time based on an average value of timestamps in the incoming transport streams. The N-QAM may be located anywhere within the network, such as at the optical fiber node between a headend and subscriber network element.

Further disclosed is a method for maintaining the local clock in the N-quadrature amplitude modulation (QAM) device, the method comprising a local clock in a N-QAM device for deriving a local time of arrival of incoming transport streams, the incoming transport streams each having a timestamp, wherein the N-QAM device is located between a headend and subscriber network element, modulating the transport streams onto a downstream carrier for delivery to subscriber network elements using the local clock time, and adjusting the local clock time in the N-QAM device based on an average value of timestamps in the incoming transport streams.

While example embodiments herein are described in reference to an Edge-QAM or N-QAM device, any modulator capable of modulating digital signals over a carrier (e.g., an RF carrier) may use the timing correction methods disclosed herein. Thus, wherever reference is made to a N-QAM device, it is understood that any modulator that modulates the digital signals over a carrier may employ the timing solutions disclosed herein. Further, the modulator using the disclosed timing correction techniques may be located anywhere suitable in the network and are not limited by the embodiments described. The modulator may be located anywhere in the network for converting signals between the CMTS and the cable modem. In an embodiment, the modulator is located deeper in the network, such as in optical node 201. In an embodiment, the modulator may be in the headend, providing a headend option that is cheaper and simpler than the existing DTI solution.

Although embodiments have been shown and described herein, it is to be understood that various modifications, substitutions, and rearrangements of parts, components, and/or process (method) steps, as well as other uses of the N-QAM can be made by those skilled in the art without departing from the novel spirit and scope of the disclosed techniques herein. For example, multiple N-QAMs may be employed in the headend or hub, local to the CMTS, or located deeper in the network downstream from the CMTS, for example.

What is claimed:

1. A timing correction device located between the headend and subscriber network element and remote from a network headend or hub in a quadrature amplitude modulation (QAM) device, the timing correction device comprising:
   a receiver for receiving incoming synch messages over an optical fiber from a network headend or hub, the incoming messages each having a timestamp inserted into the messages at the network headend or hub;
   a local clock having low jitter for deriving an approximate jittered local time for each of the incoming messages; and
   a modulator for:
      determining a time based on the approximate jittered local clock time and adjusting it by adding an offset value, the offset value assigned to the QAM device dependent on a distance of the QAM device from the network headend or hub where the timestamps are inserted;
      modulating transport streams onto a downstream carrier for delivery to subscriber network elements, replacing the timestamp in each of the incoming synch messages with the adjusted time, and
      adjusting the local clock based on an average value of timestamps in the incoming messages.

2. The device of claim 1, further configured to convert the synch messages from the network headend or hub for delivery to a subscriber network element.

3. The device of claim 1, wherein the device is located within an optical fiber node.

4. The device of claim 1, wherein the modulator is an N-quadrature amplitude modulation (QAM) modulator.

5. A timing correction device located between the headend and subscriber network element and remote from a network headend or hub in a quadrature amplitude modulation (QAM) device, the device comprising:
   a local clock having low jitter for deriving an approximate jittered local time for incoming synch messages received over an optical fiber from a network headend or hub, the incoming synch messages each having a timestamp inserted into the messages at the network headend or hub; and
   a modulator for:
      determining a time based on the approximate jittered local clock time and adjusting it by adding an offset value, the offset value assigned to the QAM device dependent on a distance of the QAM device from the network headend or hub where the timestamps are inserted;
      modulating transport streams onto a downstream carrier for delivery to subscriber network elements using the local clock time adjusted by the offset value, replacing the timestamp in each of the synch messages with the adjusted time, and
   wherein the device adjusts the local clock based on an average value of timestamps in the incoming messages.

6. The device of claim 5, wherein the device is an N-quadrature amplitude modulation (QAM) device.

7. A timing correction method for maintaining a local clock in a quadrature amplitude modulation (QAM) device located between the headend and subscriber network element, the method comprising:
   receiving incoming synch messages over an optical fiber from a network headend or hub, the incoming messages each having a timestamp inserted into the messages at the network headend or hub;
   maintaining a local clock having low jitter for deriving an approximate jittered local time for each of the incoming messages;
   deriving an approximate local time for each of the incoming messages;
   determining a time based on the approximate jittered local clock time and adjusting it by adding an offset value, the offset value assigned to the QAM device dependent on a distance of the QAM device from the network headend or hub where the timestamps are inserted;
   modulating transport streams onto a downstream carrier for delivery to subscriber network elements, replacing the timestamp in each of the synch messages with the adjusted time; and
   adjusting the local clock based on an average value of timestamps in the incoming messages.

* * * * *